US005946913A

United States Patent [19]

Manzo et al.

[11] Patent Number: 5,946,913

[45] Date of Patent: Sep. 7, 1999

[54] TANDEM MASTER CYLINDER WITH AN IMPROVED SEALING FUNCTION

[76] Inventors: Vincenzo Manzo, Via Catanaro, 5/A, Modugno, Italy, 70026; Francesco Varrese, Prol. Tenente Speranza 67, Bitonto, Italy, 70032

[21] Appl. No.: 08/624,569

[22] PCT Filed: Mar. 11, 1996

[86] PCT No.: PCT/EP96/01030

§ 371 Date: Jun. 20, 1997

§ 102(e) Date: Jun. 20, 1997

[87] PCT Pub. No.: WO96/31377

PCT Pub. Date: Oct. 10, 1996

[30] Foreign Application Priority Data

May 5, 1995 [IT] Italy .................................. TO95A0257

[51] Int. Cl.[6] ........................................................ B60T 11/20

[52] U.S. Cl. .................................. 60/562; 60/591; 60/585

[58] Field of Search .............................. 60/533, 562, 585, 60/592, 591

[56] References Cited

U.S. PATENT DOCUMENTS

| | | | |
|---|---|---|---|
| 3,557,555 | 1/1971 | Wilson et al. | 60/562 |
| 4,229,940 | 10/1980 | Higgerson et al. | 60/562 |
| 4,510,752 | 4/1985 | Gaiser | 60/562 |
| 5,542,253 | 8/1996 | Ganzel | 60/562 |

FOREIGN PATENT DOCUMENTS

| | | | |
|---|---|---|---|
| 0032857 | 1/1981 | European Pat. Off. . | |
| 2633035 | 2/1977 | Germany | 60/562 |
| 47-28390 | 7/1972 | Japan | 60/562 |
| 626222 | 7/1949 | United Kingdom . | |

*Primary Examiner*—Hoang Nguyen

*Attorney, Agent, or Firm*—Leo H. McCormick, Jr; Warren Comstock

[57] ABSTRACT

A tandem master cylinder with a bore (1*a*) for retaining primary (3) and secondary (4) pistons. The secondary piston (4) has a bearing surface (40) for retaining a ring (10) slideably located between a first spring (8) and a seal (4*b*). The ring (10) pushes the seal (4*b*) back against a shoulder (41) on the secondary piston (4) in order to transmit a compressive force to seal (4*b*). The intensity of the compressive force varies with the force exerted on and transmitted by spring (8). The secondary piston (4) has a stop piece (42) for limiting the sliding of the ring (10) in the direction of the second seal (4*b*) in the bore (1*a*) of the master cylinder resulting in better sliding of seal (4*b*) within bore (1*a*). The functional relationship between the stop piece (42) and second seal (4*b*) provided for a substantially total reduction of any pressure difference between the pressurized fluid supplied to a primary and secondary circuits supplied by the master cylinder.

1 Claim, 2 Drawing Sheets

4 11 41 4b 8 10 42 IV 12 40 IV

II - III
6
5
7
2c
2b
2a
3a
3b
3
1a
8
10
4b
4
4a
4c
9
1
1b 11
10

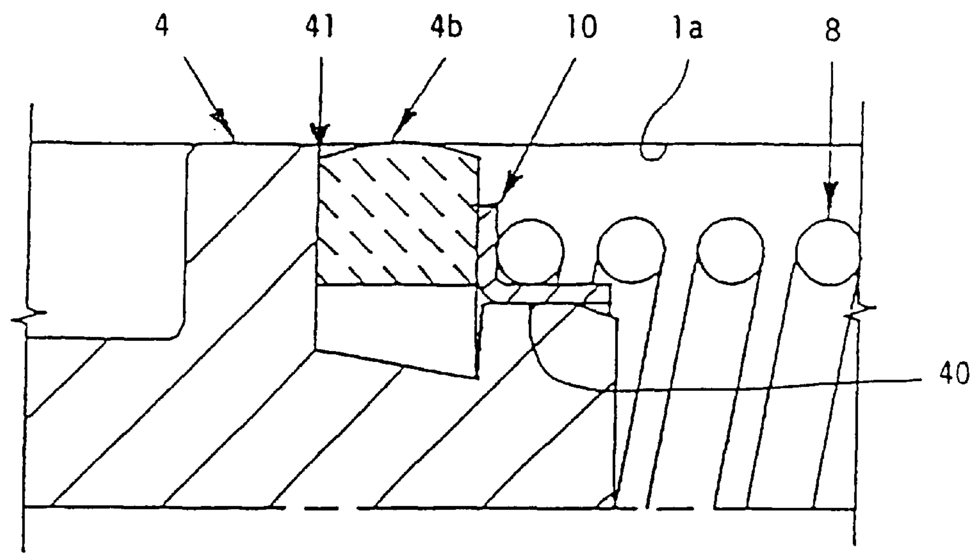
FIG.2
Prior Art
FIG.3
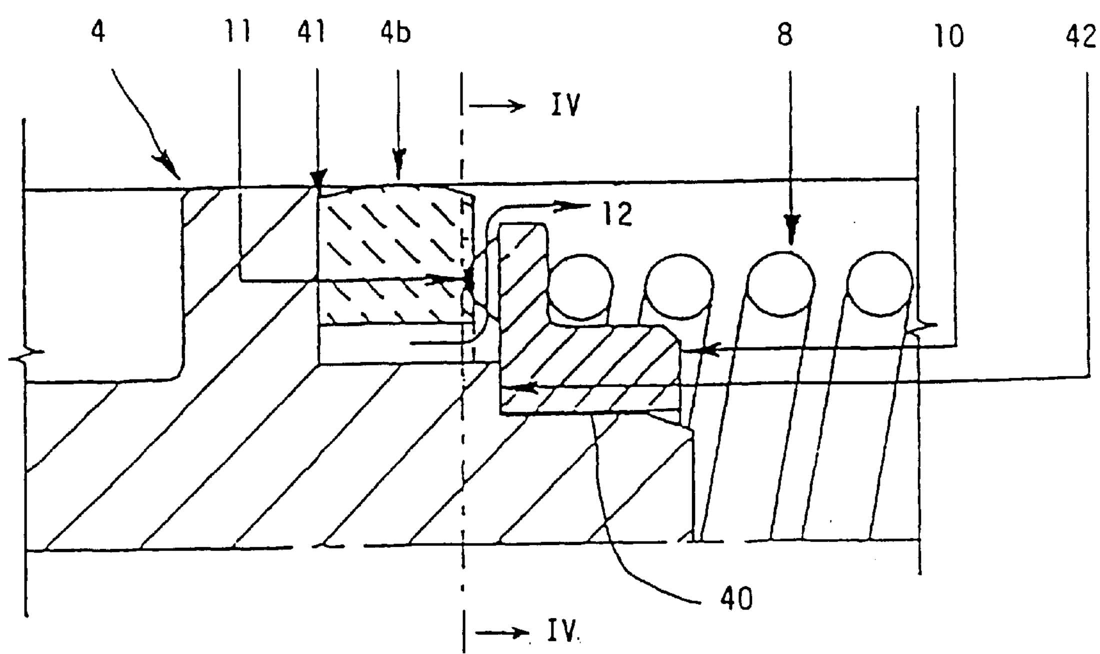

TANDEM MASTER CYLINDER WITH AN IMPROVED SEALING FUNCTION

The present invention relates to a hydraulic tandem master cylinder comprising: a body pierced with an essentially cylindrical bore closed by an end; a primary piston and a secondary piston which are capable of sliding in leaktight fashion in the bore; a primary pressure chamber defined between the primary and secondary pistons, this chamber containing at least a first spring exerting a first elastic force between the pistons, which force tends to separate these pistons from one another; a secondary pressure chamber defined between the secondary piston and the end, this chamber containing at least a second spring exerting a second elastic force between the secondary piston and the end, which force is in a direction which tends to separate this secondary piston from the end; a first seal and a second seal respectively borne by the primary piston and secondary piston in order to seal the primary pressure chamber; and a ring interposed between the first spring and the second seal slidably mounted on a bearing surface of the secondary piston and capable of pushing the second seal back against a shoulder of the secondary piston in order to transmit to the second seal a compressive force which varies with the first elastic force.

BACKGROUND OF THE INVENTION

Master cylinders of this type are very widely used nowadays.

A problem which commonly arises in tandem master cylinders is of contriving for the pressure in the secondary chamber to be as close as possible to that prevailing in the primary chamber.

One of the difficulties to be overcome in order to solve this problem lies in the conflicting nature of two requirements, namely on the one hand the need to reduce friction between the cylinder and the various seals, especially the second one, in order to reduce the pressure difference between the chambers and, on the other hand, the need to ensure that the seals are leaktight even for the highest pressures that the master cylinder is to be capable of delivering.

SUMMARY OF THE INVENTION

The object of the present invention is to provide a master cylinder making it possible to satisfy these two requirements simultaneously.

To this end, the tandem master cylinder of the invention is essentially characterized in that the bearing surface of the secondary piston has a stop piece limiting the sliding of the ring in the direction of the second seal, so as to limit the compression of the second seal.

Furthermore, according to the preferred embodiment of the invention, the ring bears reliefs pointing toward this second seal and bears on this second seal via these reliefs.

Other features and advantages of the invention will emerge clearly from the description thereof which is given hereafter, by way of non-limiting indication, with reference to the appended drawings.

BRIEF DESCRIPTION OF THE DRAWINGS

FIG. 2 is an enlarged section of a detail denoted by the reference II–III in FIG. 1, this detail being produced in accordance with the teaching of the prior art;

FIG. 3 is an enlarged section of the detail denoted by the reference II–III in FIG. 1, this detail being produced in accordance with the invention.

DETAILED DESCRIPTION OF THE INVENTION

Figure 4:
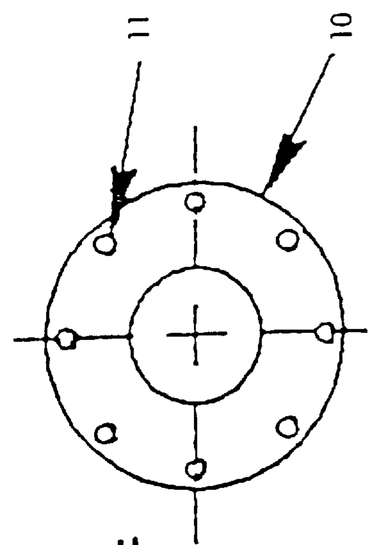
FIG. 4 is a front-on view of a detail of FIG. 3, viewed on IV—IV of this figure.

Since the tandem master cylinder of the invention is noteworthy merely with regard to very precise points which will be detailed later on in a comparative manner with reference to FIGS. 2 to 4, the master cylinder of FIG. 1 on the whole resembles all known tandem master cylinders and the description thereof will therefore not be burdened with details which are well known to the person skilled in the art and are of no relevance with regard to the invention.

This tandem master cylinder essentially comprises a body 1 pierced with a longitudinal and cylindrical bore l*a* closed by an end 1*b* and by end members 2*a*, 2*b*, 2*c* which provide sealing of the bore 1*a* on the same side as its opening.

Figure 1:
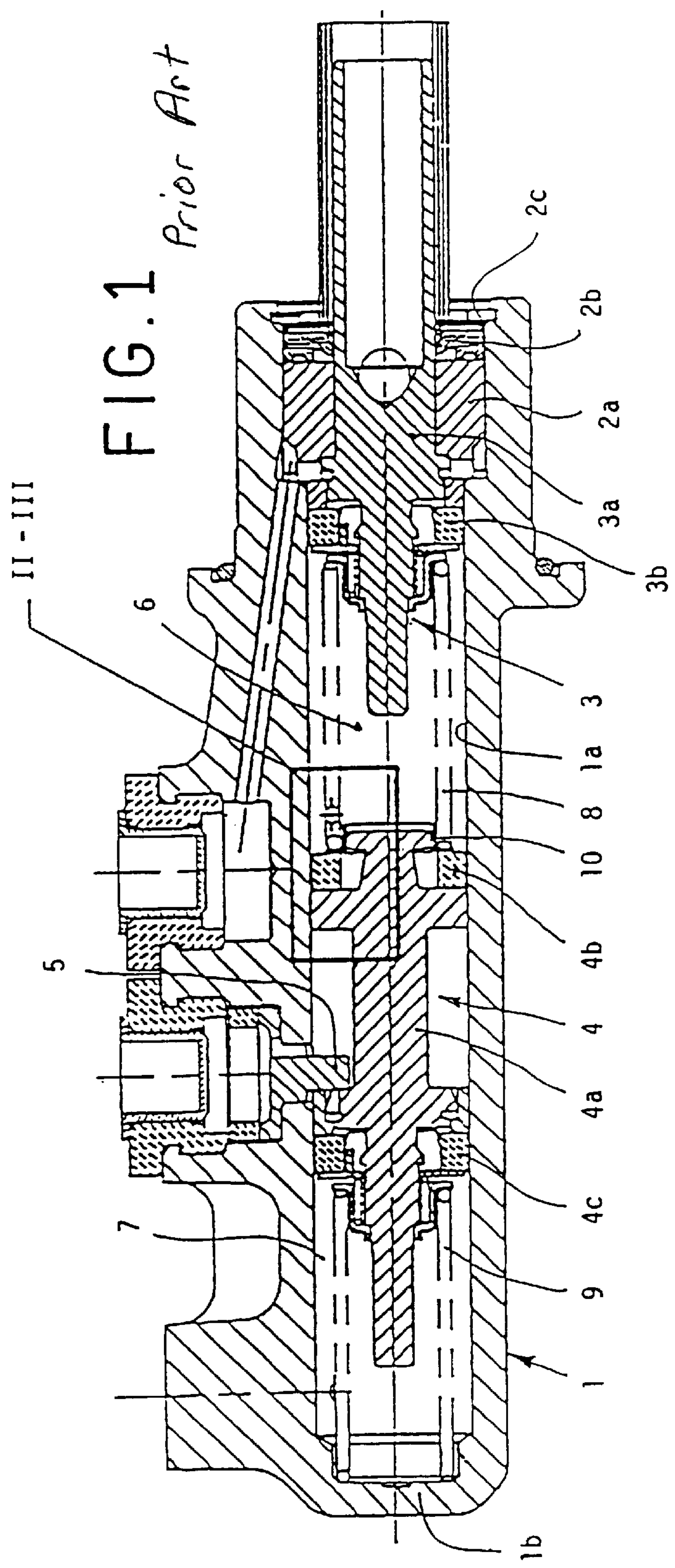
FIG. 1 is a section through a tandem master cylinder of the prior art, liable to benefit from the teaching and features of the invention.

A primary piston 3, including a rod 3*a* and a first seal 3*b* may slide in leaktight fashion in the bore 1*a* from a position of rest (the one which FIG. 1 represents) as far as an actuating position situated to the left of the position of rest in FIG. 1, at a distance which depends on the strength of the force applied to the rod 3*a*.

Likewise, a secondary piston 4 including a rod 4*a* and a second seal and a third seal 4*b*, 4*c* slides in leaktight fashion in the bore 1*a*, from a position of rest (that of FIG. 1) in which this piston is halted by a stop piece 5, as far as an actuating position in which this piston is closer to the end 1*b*.

The intermediate volume 6 between the primary and secondary pistons 3 and 4 defines a primary hydraulic pressure chamber, and the volume 7 lying between the secondary piston 4 and the end 1*b* of the bore defines a secondary hydraulic pressure chamber.

A first spring and a second spring 8, 9 are respectively located in the primary and secondary hydraulic chambers 6, 7, the first spring 8 exerting a first elastic force between the pistons 3, 4, which force tends to separate these pistons from one another, and the second spring 9 exerting a second elastic force between the secondary piston 4 and the end 1*b*, which force is in a direction which tends to separate this secondary piston from the end.

Finally, as in the prior art (FIGS. 1 and 2), a ring 10 interposed between the first spring 8 and the second seal 4*b* is slidably mounted on a bearing surface 40 of the secondary piston in order to push the second seal 4*b* back against a shoulder 41 of the secondary piston, to transmit to this second seal 4*b* a compressive force which varies with the elastic force exerted by the spring 8, and thus to provide sealing which is all the more effective, the higher the pressure in the primary chamber 6.

However, the problem posed by the conventional embodiment represented in FIG. 2, and the demonstration of which forms an integral part of the present invention, is that the load on the spring 8, which increases greatly during the final braking phase, causes very substantial axial crushing of the second seal 4*b*, and therefore very great radial expansion of this seal, this resulting in this seal rubbing excessively against the bore 1*a*, and in a substantial pressure difference between the chambers 6 and 7.

According to the invention (FIG. 3), this problem is solved by making provision for the bearing surface 40 of the secondary piston 4 to have a stop piece 42 limiting the sliding of the ring 10 in the direction of the second seal 4*b*.

Furthermore, according to a preferred embodiment of the invention (FIG. 4), the ring 10 bears reliefs such as 11 pointing toward the second seal 4*b*, and bears on this second seal 4*b* via these reliefs 11.

By virtue of these provisions, the seal 4*b* merely undergoes sufficient axial deformation to provide sealing inside the bore 1*a*, the pressure difference between the chambers 6 and 7 thus remaining negligible, the durability of the second seal 4*b* is greatly improved by the fact that it is less deformed and pressed less strongly against the bore 1*a*, and the primary chamber 6 can be purged more easily via the passage 12 left for the brake fluid between the seal 4*b* and the ring 10, through the reliefs 11.

We claim:

1. A hydraulic tandem master cylinder comprising:

a body pierced with an essentially cylindrical bore closed by an end;

a primary piston and a secondary piston which are capable of sliding in leaktight fashion in said bore, a primary pressure chamber defined between said primary and secondary pistons, said primary pressure chamber containing at least a first spring for exerting a first elastic force between said primary and secondary pistons, said first elastic force tending to separate said primary and secondary pistons from one another;

a secondary pressure chamber defined between said secondary piston and said end, said secondary pressure chamber containing at least a second spring for exerting a second elastic force between said secondary piston and said end, said second elastic force being in a direction tending to separate said secondary piston from said end; said end, said second elastic force being in a direction tending to separate said secondary piston from said end;

a first seal and a second seal respectively borne by said primary piston and said secondary piston in order to seal said primary pressure chamber, and a ring interposed between said first spring and said second seal slidably mounted on a bearing surface of said secondary piston and capable of pushing said second seal back against a shoulder of said secondary piston in order to transmit to said second seal a compressive force which varies with said first elastic force, said bearing surface having a stop piece for limiting sliding of said ring in a direction of said second seal, said ring bears reliefs pointing toward said second seal and bears on said second seal via said reliefs.

* * * * *